(12) United States Patent
Sloane et al.

(10) Patent No.: US 12,105,827 B2
(45) Date of Patent: Oct. 1, 2024

(54) SYSTEM FOR SECURE OBFUSCATION OF ELECTRONIC DATA WITH DATA FORMAT PRESERVATION

(71) Applicant: BANK OF AMERICA CORPORATION, Charlotte, NC (US)

(72) Inventors: Brandon Sloane, Indian Land, SC (US); Charles Edward Dudley, Concord, NC (US); Jinyoung Nathan Kim, Charlotte, NC (US); Adriana Tache, Falls Church, VA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 567 days.

(21) Appl. No.: 17/172,517

(22) Filed: Feb. 10, 2021

(65) Prior Publication Data
US 2022/0253544 A1  Aug. 11, 2022

(51) Int. Cl.
*G06F 21/00* (2013.01)
*G06F 21/62* (2013.01)
(Continued)

(52) U.S. Cl.
CPC .......... *G06F 21/6227* (2013.01); *G06N 5/04* (2013.01); *G06N 20/00* (2019.01); *G06F 21/6245* (2013.01)

(58) Field of Classification Search
CPC ... G06F 21/6227; G06F 21/6245; G06N 5/04; G06N 20/00
See application file for complete search history.

(56) References Cited

U.S. PATENT DOCUMENTS 8,001,607 B2   8/2011   Stull et al.
8,347,396 B2   1/2013   Grigsby et al.
(Continued)

FOREIGN PATENT DOCUMENTS

WO   0101260 A2      1/2001
WO   2009139650 A1   11/2009
WO   2020165756 A1   8/2020

OTHER PUBLICATIONS

Riboni et al., "Obfuscation of Sensitive Data for Incremental Release of Network Flows", IEEE/ACM Transactions on Networking, vol. 23, No. 2, Apr. 2014.*
(Continued)

*Primary Examiner* — Morshed Mehedi
(74) *Attorney, Agent, or Firm* — Moore & Van Allen PLLC; Gabrielle M. Carlini

(57) ABSTRACT

Embodiments of the invention are directed to systems, methods, and computer program products for utilizing machine learning to identify data which is to be obfuscated in a format-preserving manner, which allows the obfuscated or masked data to appear as though it is original data. Because this type of obfuscation technique may require a higher degree of computational power than other techniques, there is a need to be able to dynamically choose when to implement format preservation based on a variety of factors. By using machine learning techniques, the present invention provides the functional benefit of analyzing both the data to be obfuscated, as well as available computational resources, to determine when it is appropriate to apply a format-preserving masking algorithm to the data. Accordingly, the present invention may ensure that organizational data is appropriately masked while preventing the resource strain associated with preserving the format of all original data.

19 Claims, 3 Drawing Sheets

(51) Int. Cl.
  *G06N 5/04*           (2023.01)
  *G06N 20/00*          (2019.01)

(56) References Cited

U.S. PATENT DOCUMENTS

| | | | |
|---|---|---|---|
| 8,812,524 | B2 | 8/2014 | Chen et al. |
| 8,949,209 | B2 | 2/2015 | Khin et al. |
| 8,959,654 | B2 | 2/2015 | Avrahami et al. |
| 9,043,929 | B2 | 5/2015 | Avrahami et al. |
| 9,223,995 | B1 | 12/2015 | Lavinio |
| 9,251,339 | B2 | 2/2016 | Bullis et al. |
| 9,298,878 | B2 | 2/2016 | Guirguis et al. |
| 9,646,143 | B2 | 5/2017 | Lavinio |
| 9,716,692 | B2 | 7/2017 | Cismas et al. |
| 9,753,931 | B2 | 9/2017 | Burshteyn |
| 9,946,895 | B1 | 4/2018 | Kruse et al. |
| 10,037,330 | B1 | 7/2018 | Burshteyn |
| 10,102,398 | B2 | 10/2018 | Neergaard |
| 10,216,958 | B2 | 2/2019 | Avrahami et al. |
| 10,289,816 | B1 | 5/2019 | Malassenet et al. |
| 10,289,868 | B2 | 5/2019 | Jagadish et al. |
| 10,298,545 | B2 | 5/2019 | Boivie et al. |
| 10,303,559 | B2 * | 5/2019 | Vijayan ............... G06F 16/25 |
| 10,860,732 | B2 | 12/2020 | Guirguis et al. |
| 10,929,556 | B1 | 2/2021 | Kurian |
| 11,238,138 | B1 | 2/2022 | Ancheta |
| 11,588,809 | B2 | 2/2023 | Brito et al. |
| 2006/0195703 | A1 | 8/2006 | Jakubowski |
| 2011/0270837 | A1 | 11/2011 | Raj et al. |
| 2012/0079281 | A1 | 3/2012 | Lowenstein et al. |
| 2012/0239433 | A1 | 9/2012 | Kenedy |
| 2012/0272329 | A1 | 10/2012 | Grammer et al. |
| 2013/0054650 | A1 | 2/2013 | O'Byrne |
| 2013/0104239 | A1 | 4/2013 | Mclachlan et al. |
| 2014/0019467 | A1 | 1/2014 | Itoh et al. |
| 2014/0188514 | A1 | 7/2014 | Balignasay et al. |
| 2015/0074392 | A1 | 3/2015 | Boivie et al. |
| 2015/0098564 | A1 | 4/2015 | Chamley et al. |
| 2016/0092871 | A1 | 3/2016 | Gordon et al. |
| 2016/0300075 | A1 * | 10/2016 | Stankiewicz .......... G16H 50/70 |
| 2016/0342608 | A1 | 11/2016 | Burshteyn |
| 2018/0060612 | A1 | 3/2018 | Gladwin et al. |
| 2018/0248887 | A1 | 8/2018 | Sayed et al. |
| 2020/0034573 | A1 | 1/2020 | Pulkus et al. |
| 2020/0082120 | A1 | 3/2020 | Richardson |
| 2020/0159907 | A1 | 5/2020 | Johnson et al. |
| 2020/0250139 | A1 | 8/2020 | Muffat |
| 2020/0265159 | A1 | 8/2020 | Schmatz et al. |
| 2020/0265532 | A1 | 8/2020 | Lee |
| 2020/0327252 | A1 * | 10/2020 | McFall ............... G06F 21/6254 |
| 2020/0364801 | A1 | 11/2020 | Basra |
| 2021/0133557 | A1 | 5/2021 | Iyoob |
| 2021/0150038 | A1 | 5/2021 | Valecha et al. |
| 2021/0158171 | A1 | 5/2021 | Rausch |
| 2021/0174347 | A1 * | 6/2021 | Rose ................... H04L 63/0428 |
| 2021/0398128 | A1 * | 12/2021 | Huber, Jr. ............... G06N 20/00 |
| 2022/0075899 | A1 * | 3/2022 | Richardson ........... H04W 12/02 |
| 2022/0138325 | A1 | 5/2022 | Todd |
| 2022/0229913 | A1 | 7/2022 | Mack et al. |
| 2023/0107191 | A1 | 4/2023 | Wong |

OTHER PUBLICATIONS

Christian Pilato et al., "TAO: Techniques for Algorithm-Level Obfuscation during High-Level Synthesis", 2018 55th ACM/ESDA/IEEE Design Automation Conference (DAC), Jun. 2018, pp. 1-6.

Rajat Subhra Chakraborty et al., "Hardware protection and authentication through netlist level obfuscation", 2008 IEEE/ACM International Conference on Computer-Aided Design, Nov. 2008, pp. 1-4.

Smallman, A. C. (2020). Analysis of Time Activity Data Characteristics and Data Degradation in Digital Forensics (Doctoral dissertation, George Mason University). (Year: 2020).

* cited by examiner

SYSTEM FOR SECURE OBFUSCATION OF ELECTRONIC DATA WITH DATA FORMAT PRESERVATION

BACKGROUND

An organization or entity may have access to large amounts of sensitive electronic data, including organizational records and personal information of employees, customers, and vendors. In order to prevent unauthorized access to these records, an entity may utilize a variety of information security practices when accessing and/or storing data. As part of an overall strategy for protecting large amounts of sensitive data, there is a need for a system which is able to obfuscate electronic data while preserving the original format of the data.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention relate to systems, methods, and computer program products for electronic data obfuscation, the invention including: receiving a data transmission from a managing entity system, where the data transmission comprises a dataset to be obfuscated and a plurality of associated decision factors; extracting the dataset to be obfuscated from the data transmission; determining, using the associated decision factors, whether one or more values of the dataset to be obfuscated should be obfuscated via a format-preserving technique; establishing, for each value determined to be obfuscated via a format-preserving technique, a sequence of obfuscation algorithms to be applied to the value; applying, for each value determined to be obfuscated via a format-preserving technique, the established sequence of obfuscation algorithms, generating an obfuscated value; generating an obfuscated dataset, where the obfuscated dataset includes each obfuscated value; and transmitting the obfuscated dataset to the managing entity system.

In some embodiments, determining, using the associated decision factors, whether one or more values of the dataset to be obfuscated should be obfuscated using a format-preserving technique, further includes utilizing a machine learning engine.

In some embodiments, the machine learning engine is configured to analyze at least one of: one or more of the associated decision factors, one or more machine learning datasets, or one or more historical datasets to determine whether one or more values of the dataset to be obfuscated should be obfuscated using a format-preserving technique.

In some embodiments, the system includes receiving a data transmission from a remote server, where the data transmission includes an indication of available server storage and an indication of available server bandwidth.

In some embodiments, the machine learning engine is further configured to analyze the available server storage and available server bandwidth to determine whether one or more values of the dataset to be obfuscated should be obfuscated using a format-preserving technique.

In some embodiments, the system includes storing a record of the established sequence of obfuscation algorithms and a unique identifier of the obfuscated dataset.

In some embodiments, the system includes accessing the stored record of the established sequence of obfuscation algorithms and the unique identifier of the obfuscated dataset and utilizing the stored record to de-obfuscate the obfuscated dataset.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
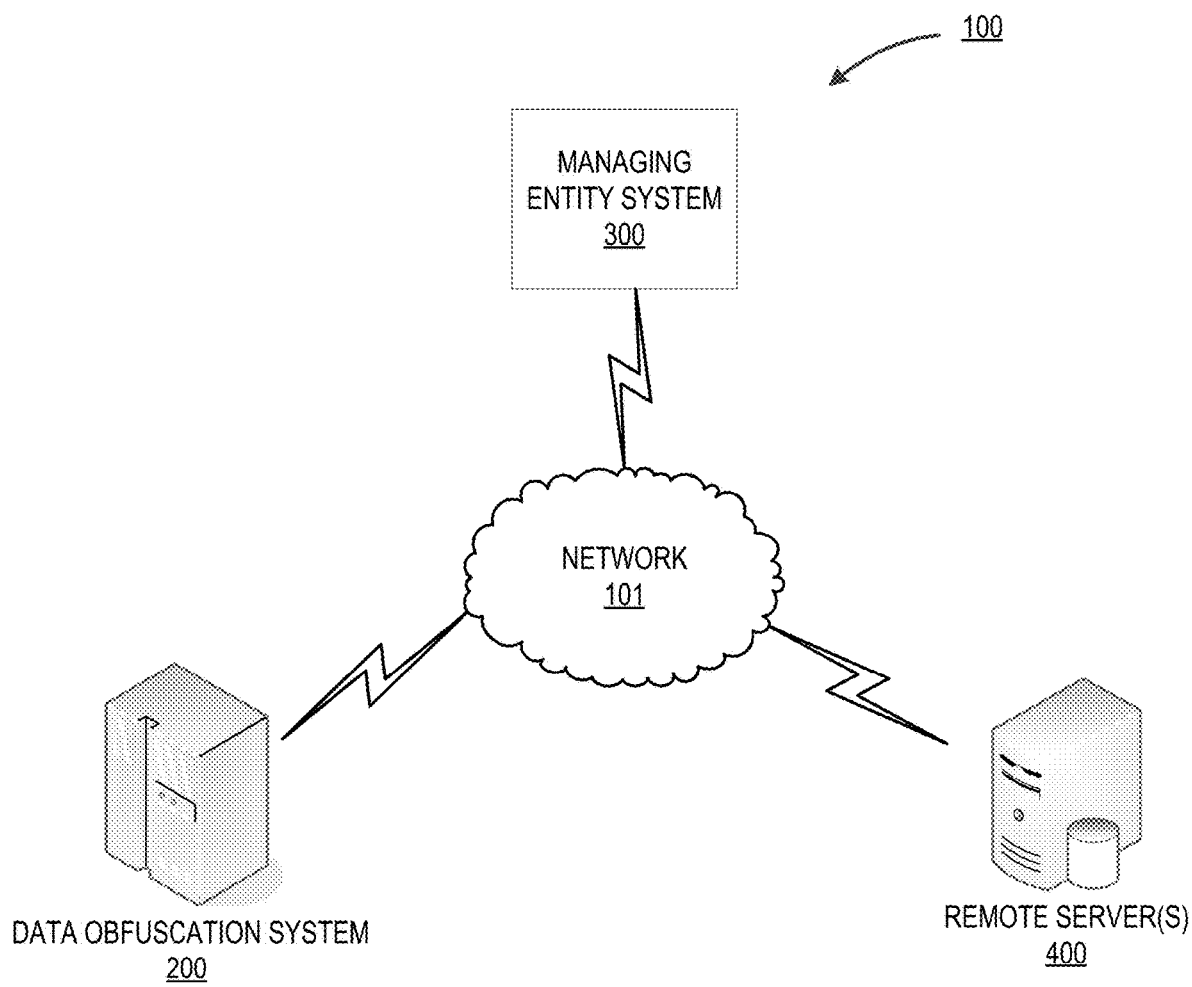
Figure 2:
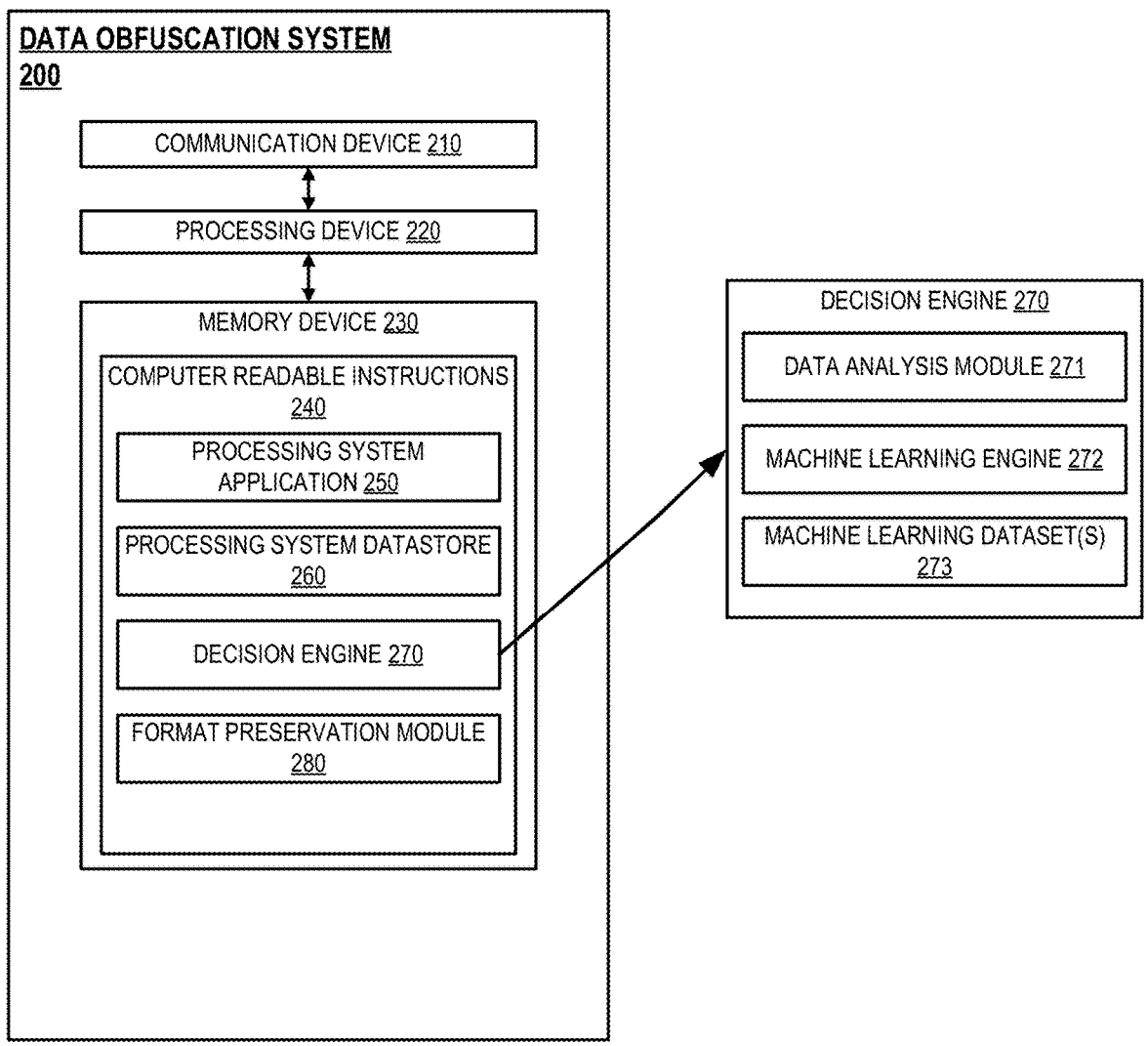
Figure 3:
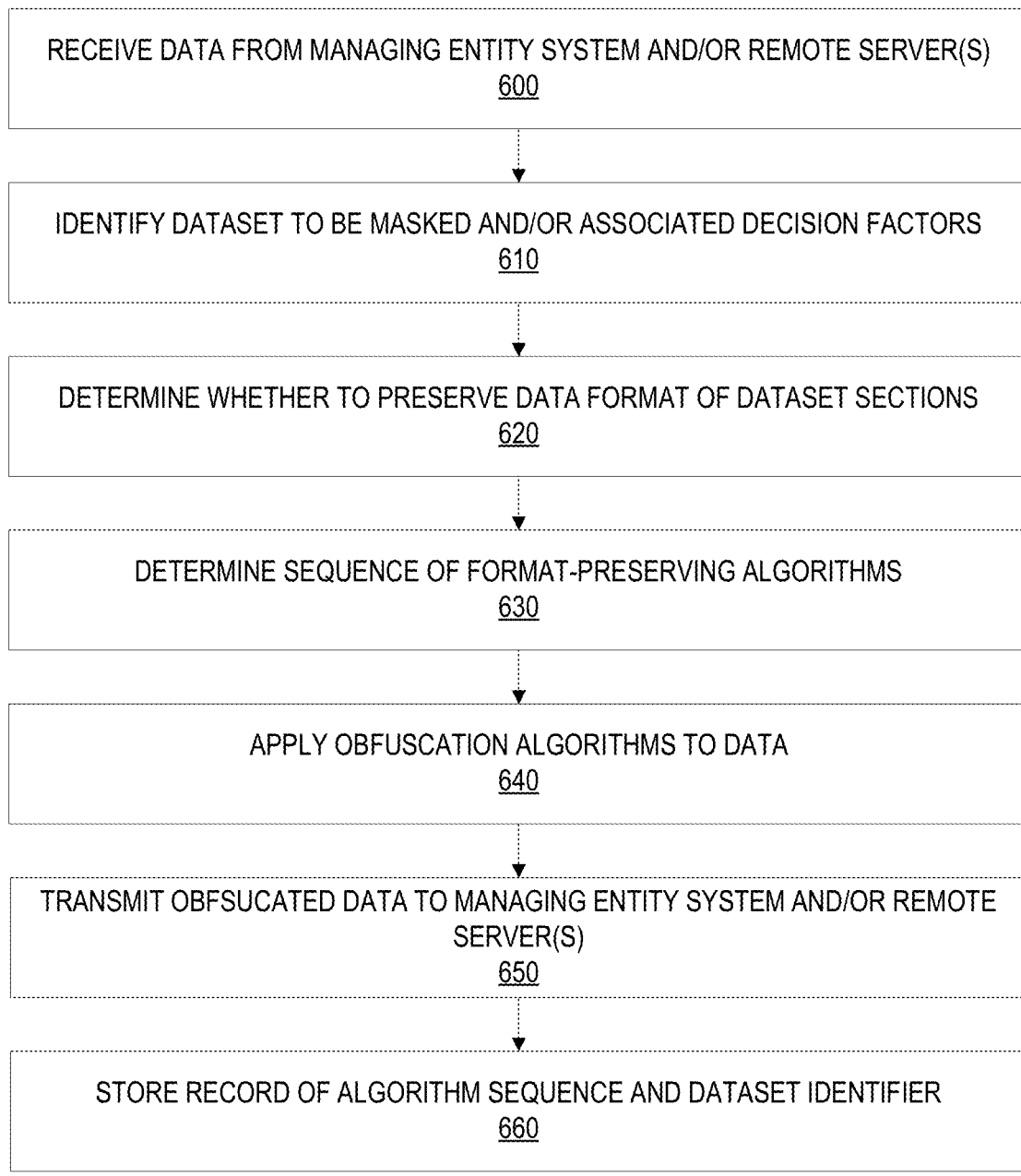

Having thus described embodiments of the invention in general terms, reference will now be made to the accompanying drawings, wherein:

FIG. 1 illustrates an operating environment for the electronic data obfuscation system, in accordance with one embodiment of the present disclosure;

FIG. 2 is a block diagram illustrating the electronic data obfuscation system; and FIG. 3 is a flow diagram illustrating a process using the electronic data obfuscation system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like which employs information technology resources and particularly technology infrastructure configured for processing large amounts of data. This data can be related to the people who work for the entity, its products or services, the customers, vendors, or any other aspect of the operations of the entity. As such, the entity or managing entity may be any institution, group, association, establishment, authority, or the like, employing information technology resources for processing large amounts of data.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"User" as used herein may refer to an individual associated with an entity. As such, in some embodiments, the user may be an individual having past relationships, current relationships or potential future relationships with an entity. In some embodiments, a user may be an employee (e.g., an associate, a manager, an administrator, or the like) of the entity or enterprises affiliated with the entity, capable of operating the systems described herein. In some instances, a "user" is an individual who has a relationship with the entity, such as a customer or a prospective customer. In other embodiments, a user may be a system performing one or more tasks described herein.

"Engine" as used herein may refer to core elements of a computer program, or part of a computer program that serves as a foundation for a larger piece of software and drives the functionality of the software. An engine may be self-contained, but externally controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to teach other with one or more components located between the components that are operatively coupled together. Furthermore, "operatively coupled" may mean that the components are detachable from each other, or that they are permanently coupled together. Furthermore, "operatively coupled" may mean that components may be electronically connected.

As used herein, "data obfuscation" or "data masking" may refer to the process of hiding or obscuring original data artifacts with modified content (characters or other data artifacts) to ensure privacy. In some embodiments, data obfuscation algorithmically substitutes realistic but false data artifacts for the original data artifacts. The resulting masked data artifacts will continue to meet the requirements of a system designed to test or still work with the masked results. In embodiments contemplated herein, data obfuscation algorithms used to mask the data artifacts are dynamic and reversible, i.e., the data obfuscation algorithms are capable of transforming the data artifacts while preserving the integrity of the data. For example, substitution-based data obfuscation algorithms allow for a given value to be mapped to an equivalent value in a secure lookup table. Data obfuscation algorithms may also be stackable, wherein an algorithm may be applied to data which is already masked in order to further obfuscate the true values. The legitimate data artifacts remain in the data repository and are accessible when authorized by the system described herein. During de-obfuscation or unmasking processes, the original data is de-obfuscated in real-time on-demand to make the contents unmasked.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making a prediction about a dataset. Machine learning algorithms contemplated, described, and/or used herein include supervised learning (e.g., using logistic regression, using back propagation neural networks, using random forests, decision trees, and the like), unsupervised learning (e.g., using an Apriori algorithm, using K-means clustering), semi-supervised learning, reinforcement learning (e.g., using a Q-learning algorithm, using temporal difference learning), and/or any other suitable machine learning model types. Each of these types of machine learning algorithms can implement any of one or more of a regression algorithm (e.g., ordinary least squares, logistic regression, stepwise regression, multivariate adaptive regression splines, locally estimated scatterplot smoothing, and the like), an instance-based method (e.g., k-nearest neighbor, learning vector quantization, self-organizing map, and the like), a regularization method (e.g., ridge regression, least absolute shrinkage and selection operator, elastic net, and the like), a decision tree learning method (e.g., classification and regression tree, C4.5, chi-squared automatic interaction detection, decision stump, random forest, multivariate adaptive regression splines, gradient boosting machines, and the like), a Bayesian method (e.g., naïve Bayes, averaged one-dependence estimators, Bayesian belief network, and the like), a kernel method (e.g., a support vector machine, a radial basis function, a linear analysis, and the like), a clustering method (e.g., k-means clustering, expectation maximization, and the like), an associated rule learning algorithm, an artificial neural network model (e.g., a Perceptron method, a back-propagation method, a Hopfield network method, a self-organizing map method, a learning vector quantization method, and the like), a deep learning algorithm (e.g., a deep belief network method, a convolution network method, a stacked auto-encoder method, and the like), a dimensionality reduction method (e.g., principal component analysis, partial least squares regression, multidimensional scaling, projection pursuit, and the like), an ensemble method (e.g., boosting, bootstrapped aggregation, stacked generalization, gradient boosting machine method, random forest method, and the like), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Embodiments of the invention relate to the use of artificial intelligence and machine learning techniques to analyze the efficacy of obfuscation algorithms implemented on data artifacts. The obfuscation algorithms required to substitute realistic but false data artifacts for the original data artifacts, or preserve the original data format, may require a higher degree of computational power to execute than other obfuscation algorithms. Additionally, the data to be obfuscated may vary in sensitivity or degree of masking required. Therefore, there is a need to dynamically choose the most effective data obfuscation algorithms for implementation. By using machine learning techniques, the present invention provides the functional benefit of analyzing both the data to be obfuscated, as well as available computational resources, to determine when it is appropriate to apply a format-preserving masking algorithm to the data. Accordingly, the present invention may ensure that organizational data is appropriately masked while preventing the resource strain associated with preserving the format of all original data.

FIG. 1 illustrates an operating environment 100 for the electronic data obfuscation system, in accordance with one embodiment of the present disclosure. As illustrated, the operating environment 100 includes a data obfuscation system 200, a managing entity system 300, and one or more remote servers 400 which may be in operative communication with a network 101 as depicted. In some embodiments, the data obfuscation system 200, the managing entity system 300, and the one or more remote servers 400 may be used to implement the processes described herein, in accordance with an embodiment of the present invention. In this regard, the data obfuscation system 200 may include one or more applications stored thereon that are configured to interact with one another, the managing entity system 300, and the one or more remote servers 400 to implement any one or more portions of the process flows described herein, Typically, the data obfuscation system 200 and the one or more remote servers 400 are in operative communication with the managing entity system 300, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the data obfuscation system 200 and the managing entity system 300). In this regard, the wireless communication channel may further comprise near field communication (NFC), communication via radio waves, communication through the internet, communication via electromagnetic waves and the like.

The managing entity system 300 may comprise a communication module and memory not illustrated and may be configured to establish operative communication channels with the data obfuscation system 200 and/or the one or more remote servers 400 via a network 101. The managing entity system 300 may comprise an organizational data repository which stores organizational data and/or records, as well as associated metadata. Metadata associated with the data may include an indication of data type, user/viewer permissions, data creation date, and other information as is described in further detail herein. The organizational data may be accessed by the data obfuscation system 200 in order to be obfuscated or masked and then transmitted back to the managing entity system 300. In some embodiments, some or all of the organizational data repository and/or associated metadata may be stored by the one or more remote servers 400, and the data obfuscation system 200 may query the remote server(s) 400 to access data to be obfuscated. In some embodiments, the data obfuscation system 200 may be fully integrated within the managing entity system 300.

As will be discussed in greater detail in FIG. 3, the managing entity system 300 may communicate with the data obfuscation system 200 in order to transmit data stored by the managing entity system 300 and/or the remote server(s) 400. In some embodiments, the managing entity may utilize the features and functions of the data obfuscation system to obtain masked data which maintains the original data format. As discussed, this data will continue to meet the requirements of a system designed to test or still work with the masked results. In some embodiments, the managing entity may utilize the features and features of the data obfuscation system to ascertain whether a given dataset should be masked in a format-preserving manner based on a plurality of dynamic decision-making factors.

FIG. 2 illustrates a block diagram of the electronic data obfuscation system 200 associated with the operating environment 100, in accordance with embodiments of the present invention. As illustrated in FIG. 2, the electronic data obfuscation system 200 may include a communication device 210, a processing device 220, and a memory device 230 having a decision engine 270, a format preservation module 280, a processing system application 250 and a processing system datastore 260 stored therein. As shown, the processing device 220 is operatively connected to and is configured to control and cause the communication device 210 and the memory device 230 to perform one or more functions. In some embodiments, the format preservation module 280, the decision engine 270 and/or the processing system application 250 comprise computer readable instructions 240 that when executed by the processing device 220 cause the processing device 220 to perform one or more functions and/or transmit control instructions to the managing entity system 300, the remote server(s) 400 and/or the communication device 210. It will be understood that the format preservation module 280, the decision engine 270 and/or the processing system application 250 may be executable to initiate, perform, complete, and/or facilitate one or more portions of any embodiments described and/or contemplated herein. The format preservation module 280 may comprise executable instructions associated with data processing related to format-preserving data obfuscation algorithms and may be embodied within the processing system application 250 in some instances. The data obfuscation system 200 may be owned by, operated by and/or affiliated with the same managing entity that owns or operates the managing entity system 300. In some embodiments, the data obfuscation system 200 is fully integrated within the managing entity system 300.

The decision engine 270 may further comprise a data analysis module 271, a machine learning engine 272, and a machine learning dataset(s) 273. The data analysis module 271 may store instructions and/or data that may cause or enable the data obfuscation system 200 to receive, store, and/or analyze data received by the managing entity system 300 or the remote server(s) 400. The data analysis module may process data and/or metadata to identify decision factors as will be further discussed in FIG. 4. The machine learning engine 272 and machine learning dataset(s) 273 may store instructions and/or data that cause or enable the data obfuscation system 200 to determine, in real-time and based on received information, an appropriate data obfuscation algorithm or series of algorithms for the received data. The machine learning dataset(s) 273 may contain data queried from the remote server(s) 300 and/or may be based on historical data relating to a particular data category, threat level assignment, data type, or the like. In some embodiments, the machine learning dataset(s) 273 may also contain data relating to a plurality of obfuscation algorithms other than format-preserving algorithms.

The machine learning engine 272 may receive data from a plurality of sources and, using one or more machine learning algorithms, may generate one or more machine learning datasets 273. Various machine learning algorithms may be used without departing from the invention as is described in greater detail herein.

The machine learning datasets 273 may include machine learning data linking one or more decision factors (e.g. data type, data hierarchy, threat level assignment, data storage location, available computing power, and the like) with one or more available obfuscation algorithms to identify one or more obfuscation techniques or algorithm sequences that may appropriately mask a given data set while preventing undesired resource strain. For example, the machine learning datasets 273 may include information linking datasets containing image files (e.g. scanned documents, driver's license or passport images, and the like) with a higher potential for file corruption. The machine learning datasets 273 may also include information linking the dataset storage location (e.g. a private server instead of a cloud or edge server) with a lower threat level assignment. The combination of this information may cause the decision engine 270 to determine that a format-preserving obfuscation algorithm should be applied to a privately hosted dataset containing image files, but that only one or two layers of obfuscation should be performed in order to converse computing power for other data stored in less secure locations.

The communication device 210 may generally include a modem, server, transceiver, and/or other devices for communicating with other devices on the network 101. The communication device 210 may be a communication interface having one or more communication devices configured to communicate with one or more other devices on the network 101, such as the managing entity system 300, the remote server(s) 400, and/or other processing systems, data systems, and the like Additionally, referring to the data obfuscation system 200 illustrated in FIG. 2, the processing device 220 may generally refer to a device or combination of devices having circuitry used for implementing the communication and/or logic functions of the data obfuscation system 200. For example, the processing device 220 may include a control unit, a digital signal processor device, a microprocessor device, and various analog-to-digital converters, digital-to-analog converters, and other support circuits and/or combinations of the foregoing. Control and signal processing functions of the data obfuscation system 200 may be allocated between these processing devices according to their respective capabilities. The processing device 220 may further include functionality to operate one or more software programs based on computer-executable program code 240 thereof, which may be stored in a memory device 230, such as the processing system application 250 and the decision engine 270. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 220 may be configured to use the network communication interface of the communication device 210 to transmit and/or receive data and/or commands to and/or from the other devices/systems connected to the network 101.

The memory device 230 within the data obfuscation system 200 may generally refer to a device or combination of devices that store one or more forms of computer-readable media for storing data and/or computer-executable program code/instructions. For example, the memory device 230 may include any computer memory that provides an actual or virtual space to temporarily or permanently store data and/or commands provided to the processing device 220 when it carries out its functions described herein. As used herein, memory may include any computer readable medium configured to store data, code, or other information. The memory device 350 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the data obfuscation system 200 performing one or more steps described herein in conjunction with other devices and systems, either automatically based on executing computer readable instructions of the memory device 230, or in response to receiving control instructions from the managing entity system 300. In some instances, the system refers to the devices and systems on the operating environment 100 of FIG. 1. The features and functions of various embodiments of the invention are be described below in further detail. It is understood that the servers, systems, and devices described herein illustrate one embodiment of the invention. It is further understood that one or more of the servers, systems, and devices can be combined in other embodiments and still function in the same or similar way as the embodiments described herein.

FIG. 3 is a high-level process flow diagram illustrating a process using the data obfuscation system, in accordance with one embodiment of the present disclosure. The process begins at block 600, where the system receives a data transmission from the managing entity system 300 or the remote server(s) 400, containing a dataset to be obfuscated as well as associated metadata containing a plurality of decision factors to be utilized by the decision engine 270. The decision factors may include but are not limited to factors such as data type (e.g. employee information, vendor information, customer information, organization information, and the like), authorized user or viewer group (e.g. general public, general organization, department or team-only, or individual-only), data storage location (e.g. cloud, edge server, private server), data creation date, available system bandwidth, available system storage, and the like. In some embodiments the system may receive a unique data transmission after the generation or alteration of each dataset to be obfuscated, or the managing entity may choose to group datasets together and send an aggregated data transmission after a predetermined amount of time, such as once per day. In some embodiments, the system may also receive real-time decision factor transmissions from the remote server(s) 400 as factors such as available storage and bandwidth change. The process may then continue to block 610, wherein for each individual data transmission, the system may utilize the data analysis module 271 of the decision engine 270 to extract the dataset to be obfuscated and the associated metadata and decision factors.

The process may then continue to block 620, wherein the system may utilize the decision engine 270 to determine, based on the dataset to be obfuscated, the associated decision factors, the machine learning datasets 273, historical data, and/or additional data from the remote server(s) 400, whether any portions of the dataset should be obfuscated via a format-preserving technique. For example, the system may decide to preserve the format of the entire dataset, only certain values of the dataset, or no values of the dataset. The process may then continue to block 630, where for each value or set of values to be format-preserved, the system may determine a sequence of obfuscation algorithms to be applied to the data to maximize obfuscation complexity while preserving computational power.

In 640 of FIG. 3, the process continues with the sequence of format-preserving obfuscation algorithms being applied to the dataset via the format-preservation module 280. The output of this step is an obfuscated dataset, where all, some, or none of the data values within the set may match the original data format. The process then continues to block 650, where the system transmits the obfuscated dataset to the managing entity system 300 and/or the remote server(s) 400. The process is complete in block 660, where the system stores a record of the algorithm sequence used, along with a unique identifier of the dataset. This record may be stored by the system as a new machine learning dataset 273 or may be exported to one or more remote server(s) 400. The record may be used to aid in future analysis by the decision engine and may also be utilized in de-obfuscating or unmasking the dataset as needed.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 12020US1.014033.3957 | 17/172,959 | SYSTEM FOR IMPLEMENTING DYNAMIC DATA OBFUSCATION USING PATTERN RECOGNITION TECHNIQUES | Feb. 10, 2021 |
| 12021US1.014033.3958 | 17/172,994 | SYSTEM FOR IDENTIFICATION OF OBFUSCATED ELECTRONIC DATA THROUGH PLACEHOLDER INDICATORS | Feb. 10, 2021 |
| 12024US1.014033.3960 | 17/172,494 | SYSTEM FOR ELECTRONIC DATA OBFUSCATION THROUGH ALTERATION OF DATA FORMAT | Feb. 10, 2021 |
| 12026US1.014033.3963 | 17/173,027 | SYSTEM FOR IMPLEMENTING MULTI-DIMENSIONAL DATA OBFUSCATION | Feb. 10, 2021 |

What is claimed is:

1. A system for electronic data obfuscation, the system comprising:
   at least one non-transitory storage device; and
   at least one processing device coupled to the at least one non-transitory storage device, wherein the at least one processing device is configured to:
      receive a data transmission from a managing entity system, wherein the data transmission comprises a dataset to be obfuscated and a plurality of associated decision factors, the plurality of associated decision factors comprising at least a current data storage location of the dataset and information associated with an amount of available system storage;
      extract the dataset to be obfuscated from the data transmission;
      determine, using the associated decision factors, whether one or more values of the dataset to be obfuscated should be obfuscated via a format-preserving technique;
      establish, for each value determined to be obfuscated via a format-preserving technique, a sequence of obfuscation algorithms to be applied to the value;
      apply, for each value determined to be obfuscated via a format-preserving technique, the established sequence of obfuscation algorithms, generating an obfuscated value;
      generate an obfuscated dataset, wherein the obfuscated dataset comprises each obfuscated value;
      generate a record of the established sequence of obfuscation algorithms, wherein the record is stored in a repository of machine learning datasets; and
      transmit the obfuscated dataset to the managing entity system.

2. The system of claim 1, wherein determining, using the associated decision factors, whether one or more values of the dataset to be obfuscated should be obfuscated using a format-preserving technique, further comprises utilizing a machine learning engine.

3. The system of claim 2, wherein the machine learning engine is configured to analyze at least one of: one or more of the associated decision factors, one or more machine learning datasets, or one or more historical datasets to determine whether one or more values of the dataset to be obfuscated should be obfuscated using a format-preserving technique.

4. The system of claim 3, wherein the at least one processing device is further configured to receive a data transmission from a remote server, wherein the data transmission comprises an indication of available server storage and an indication of available server bandwidth.

5. The system of claim 4, wherein the machine learning engine is further configured to analyze the available server storage and the available server bandwidth to determine whether one or more values of the dataset to be obfuscated should be obfuscated using a format-preserving technique.

6. The system of claim 1, wherein the record of the established sequence of obfuscation algorithms further comprises a unique identifier of the obfuscated dataset.

7. The system of claim 6, wherein the at the least one processing device is further configured to access the stored record of the established sequence of obfuscation algorithms and the unique identifier of the obfuscated dataset and utilize the stored record to de-obfuscate the obfuscated dataset.

8. A computer program product for electronic data obfuscation, the computer program product comprising at least one non-transitory computer-readable medium having computer-readable program code portions embodied therein, the computer-readable program code portions comprising:
   an executable portion configured for receive a data transmission from a managing entity system, wherein the data transmission comprises a dataset to be obfuscated and a plurality of associated decision factors, the plurality of associated decision factors comprising at least current data storage location of the dataset and information associated with an amount of available system storage;
   an executable portion configured for extracting the dataset to be obfuscated from the data transmission;
   an executable portion configured for determining, using the associated decision factors, whether one or more values of the dataset to be obfuscated should be obfuscated via a format-preserving technique;
an executable portion configured for establishing, for each value determined to be obfuscated via a format-preserving technique, a sequence of obfuscation algorithms to be applied to the value;
an executable portion configured for applying, for each value determined to be obfuscated via a format-preserving technique, the established sequence of obfuscation algorithms, generating an obfuscated value;
an executable portion configured for generating an obfuscated dataset, wherein the obfuscated dataset comprises each obfuscated value;
an executable portion configured for generating a record of the established sequence of obfuscation algorithms, wherein the record is stored in a repository of machine learning datasets; and
an executable portion configured for transmitting the obfuscated dataset to the managing entity system.

9. The computer program product of claim 8, wherein the executable portion configured for determining, using the associated decision factors, whether one or more values of the dataset to be obfuscated should be obfuscated using a format-preserving technique, further comprises an executable portion configured for utilizing a machine learning engine.

10. The computer program product of claim 9, wherein the machine learning engine is configured to analyze at least one of: one or more of the associated decision factors, one or more machine learning datasets, or one or more historical datasets to determine whether one or more values of the dataset to be obfuscated should be obfuscated using a format-preserving technique.

11. The computer program product of claim 10, further comprising an executable portion configured for receiving a data transmission from a remote server, wherein the data transmission comprises an indication of available server storage and an indication of available server bandwidth.

12. The computer program product of claim 11, wherein the machine learning engine is further configured to analyze the available server storage and available server bandwidth to determine whether one or more values of the dataset to be obfuscated should be obfuscated using a format-preserving technique.

13. The computer program product of claim 8, wherein the record of the established sequence of obfuscation algorithms further comprises a unique identifier of the obfuscated dataset.

14. The computer program product of claim 13, further comprising an executable portion configured for accessing the stored record of the established sequence of obfuscation algorithms and the unique identifier of the obfuscated dataset and utilize the stored record to de-obfuscate the obfuscated dataset.

15. A computer-implemented method for electronic data obfuscation, the method comprising:
providing a computing system comprising a computer processing device and a non-transitory computer readable medium, wherein the computer readable medium comprises configured computer program instruction code, such that when said instruction code is operated by said computer processing device, said computer processing device performs the following operations:
receive a data transmission from a managing entity system, wherein the data transmission comprises a dataset to be obfuscated and a plurality of associated decision factors, the plurality of associated decision factors comprising at least current data storage location of the dataset and information associated with an amount of available system storage;
extract the dataset to be obfuscated from the data transmission;
determine, using the associated decision factors, whether one or more values of the dataset to be obfuscated should be obfuscated via a format-preserving technique;
establish, for each value determined to be obfuscated via a format-preserving technique, a sequence of obfuscation algorithms to be applied to the value;
apply, for each value determined to be obfuscated via a format-preserving technique, the established sequence of obfuscation algorithms, generating an obfuscated value;
generate an obfuscated dataset, wherein the obfuscated dataset comprises each obfuscated value;
generating a record of the established sequence of obfuscation algorithms, wherein the record is stored in a repository of machine learning datasets; and
transmit the obfuscated dataset to the managing entity system.

16. The system of claim 15, wherein determining, using the associated decision factors, whether one or more values of the dataset to be obfuscated should be obfuscated using a format-preserving technique, further comprises utilizing a machine learning engine, wherein the machine learning engine is configured to analyze at least one of: one or more of the associated decision factors, one or more machine learning datasets, or one or more historical datasets to determine whether one or more values of the dataset to be obfuscated should be obfuscated using a format-preserving technique.

17. The system of claim 16, wherein the at least one processing device is further configured to receive a data transmission from a remote server, wherein the data transmission comprises an indication of available server storage and an indication of available server bandwidth.

18. The system of claim 17, wherein the machine learning engine is further configured to analyze the available server storage and available server bandwidth to determine whether one or more values of the dataset to be obfuscated should be obfuscated using a format-preserving technique.

19. The system of claim 16, wherein the record of the established sequence of obfuscation algorithms further comprises a unique identifier of the obfuscated dataset and wherein the at the least one processing device is further configured to access the stored record of the established sequence of obfuscation algorithms and the unique identifier of the obfuscated dataset and utilize the stored record to de-obfuscate the obfuscated dataset.

* * * * *